United States Patent
Elsherif et al.

(10) Patent No.: US 9,107,126 B2
(45) Date of Patent: Aug. 11, 2015

(54) RADIO RESOURCE CONTROL FOR DUAL-ACCESS-TECHNOLOGY CELLS

(71) Applicant: FUJITSU LIMITED, Kawasaki-shi, Kanagawa (JP)

(72) Inventors: Ahmed Ragab Elsherif, Santa Clara, CA (US); Wei-Peng Chen, Fremont, CA (US)

(73) Assignee: FUJITSU LIMITED, Kawasaki (JP)

( * ) Notice: Subject to any disclaimer, the term of this patent is extended or adjusted under 35 U.S.C. 154(b) by 187 days.

(21) Appl. No.: 13/862,393

(22) Filed: Apr. 13, 2013

(65) Prior Publication Data

US 2014/0307552 A1 Oct. 16, 2014

(51) Int. Cl.
| | | |
|---|---|---|
| H04W 36/14 | (2009.01) | |
| H04W 16/14 | (2009.01) | |
| H04W 72/12 | (2009.01) | |
| H04W 28/24 | (2009.01) | |
| H04W 88/10 | (2009.01) | |

(52) U.S. Cl.
CPC .............. *H04W 36/14* (2013.01); *H04W 16/14* (2013.01); *H04W 72/1215* (2013.01); *H04W 28/24* (2013.01); *H04W 88/10* (2013.01)

(58) Field of Classification Search
None
See application file for complete search history.

(56) References Cited

U.S. PATENT DOCUMENTS

| 8,126,473 B1 | 2/2012 | Kim et al. | |
|---|---|---|---|
| 2007/0026868 A1 | 2/2007 | Schulz et al. | |
| 2008/0076386 A1* | 3/2008 | Khetawat et al. | 455/410 |
| 2010/0009690 A1* | 1/2010 | Jin et al. | 455/450 |
| 2010/0080163 A1* | 4/2010 | Krishnamoorthi et al. | 370/312 |
| 2012/0094681 A1* | 4/2012 | Freda et al. | 455/452.1 |
| 2012/0113839 A1* | 5/2012 | Etemad | 370/252 |
| 2014/0043979 A1* | 2/2014 | Etemad et al. | 370/237 |
| 2014/0044105 A1* | 2/2014 | Bontu et al. | 370/336 |
| 2014/0112289 A1* | 4/2014 | Kim et al. | 370/329 |
| 2014/0148191 A1* | 5/2014 | Feng et al. | 455/454 |

FOREIGN PATENT DOCUMENTS

EP  1 641 308 A1  3/2006

OTHER PUBLICATIONS

V. Chandrasekhar, J. Andrews, and A. Gathere, "Femtocell Networks: a Survey," IEEE Comm. Magazine, vol. 46, No. 9, pp. 59-67, 2008.

D. Lopez-Perez, G. Roche, A. Valcarce, A. Juttner, and J. Zhang, "Interference Avoidance and Dynamic Frequency Planning for WiMAX Femtocells Networks," in IEEE ICCS, 2008.

G. Gür, S. Bayhan, and F. Alagöz, "Cognitive femtocell networks: an overlay architecture for localized dynamic spectrum access," IEEE Wireless Communications, vol. 17, pp. 62-70, Aug. 2010.

(Continued)

*Primary Examiner* — Eunsook Choi
(74) *Attorney, Agent, or Firm* — Maschoff Brennan

(57) ABSTRACT

According to an aspect of an embodiment, a base station includes a first interface, a second interface, a third interface, and an allocator. The first interface communicates with a plurality of terminals via a licensed radio spectrum. The second interface communicates with the plurality of terminals via an unlicensed radio spectrum. The third interface receives from a central controller a licensed radio spectrum assignment including a set of assigned physical resource blocks associated with the licensed radio spectrum. The allocator allocates unlicensed radio spectrum resources and the physical resource blocks among the plurality of terminals.

22 Claims, 5 Drawing Sheets

(56) References Cited

OTHER PUBLICATIONS

"Technical Specification Group Services and System Aspects; Local IP Access and Selected IP Traffic Offload (LIPA-SIPTO) (Release 10)," 3GPP TR 23.829, v10.0.1, Oct. 2011. [Online]. Available: http://www.3gpp1.eu/ftp/Specs/archive/23 series/23.829/.

"Technical Specification Group Services and System Aspects; IP flow mobility and seamless Wireless Local Area Network (WLAN) offload; Stage 2 (Release 10)," 3GPP TS 23.261, v10.2.0, Mar. 2012. [Online]. Available: http://www.3gpp.org/ftp/Specs/archive/23 series/23.261/.

Z. Dai, R. Fracchia, J. Gosteau, P. Pellati, G. Vivier, "Vertical handover criteria and algorithm in IEEE 802.11 and 802.16 hybrid networks," in IEEE International Conference on Communications (ICC), May 2008.

F. Liu, E. Erkip, M. Beluri, R. Yang, E. Bala, "Dual-Band Femtocell Traffic Balancing Over Licensed and Unlicensed Bands," in IEEE International Conference on Communications (ICC), Jun. 2012.

Qualcomm, "Enterprise Multi-Femtocell Deployment Guideline", [Online]. Available: http://www.qualcomm.com/media/documents/files/qualcomm-research-enterprise-femtocell.pdf, Jun. 23, 2011.

"Technical Specification Group Services and System Aspects; Evolved Universal Terrestrial Radio Access (E-UTRA); FDD Home eNode B (HeNB) Radio Frequency (RF) requirements analysis (Release 11)," 3GPP TR 36.921 V11.0.0, Sep. 2012. [Online]. Available: http://www.3gpp.org/ftp/Specs/archive/36_series/36.921/.

S. Sadr and R. Adve, "Hierarchical resource allocation in femtocell networks using graph algorithms," in IEEE International Conference on Communications (ICC), Jun. 2012.

M. Y. Arslan, J. Yoon, K. Sundaresan, S. V. Krishnamurthy, S. Banerjee, "A Resource Management System for Interference Mitigation in Enterprise OFDMA Femtocells," IEEE/ACM Transactions on Networking, Nov. 2012.

P. Mogensen et al., "LTE capacity compared to the Shannon bound," in Proc. of Vehicular Technology Conference (VTC2007), Apr. 2007.

IEEE Standard for Wireless LAN Medium Access Control (MAC) and Physical Layer (PHY) Specifications, Nov. 1997. P802.11.

G. Bianchi, "Performance Analysis of the IEEE 802.11 Distributed Coordination Function", IEEE Journal on Selected Areas in Communications, vol. 18, No. 3, Mar. 2000.

D. Malone, K. Duffy, D. Leith, "Modeling the 802.11 Distributed Coordination Function in Nonsaturated Heterogeneous Conditions", IEEE/ACM Transactions on Networking, vol. 15, No. 1, Feb. 2007.

C. H. Foh and J. W. Tantra, "Comments on IEEE802.11 Saturation Throughput Analysis with Freezing of Backoff Counters," IEEE Communications Letters, vol. 9, pp. 130-132, Feb. 2005.

Y. Imagaki, K. Kashiki, K. Yamazaki and A. Yamaguchi, "Novel Wi-Fi Throughput Estimation Method Considering CSMA/CA Behavior," in 75th IEEE Vehicular Technology Conference (VTC Spring), May 2012.

A. Johnsson and M. Bjorkman, "On Measuring Available Bandwidth in Wireless Networks," in 33rd IEEE Conference on Local Computer Networks, Oct. 2008.

P. Dely, A.J. Kassler, D. Sivchenko, "Theoretical and Experimental Analysis of the Channel Busy Fraction in IEEE 802.11," in Future Network and Mobile Summit, Jun. 2010.

"Technical Specification Group Services and System Aspects; Policy and charging control architecture (Release 11)," 3GPP TR 23.203 V11.8.0, Dec. 2012. [Online]. Available: http://www.3gpp.org/ftp/Specs/html-info/23203.htm/.

D. Br' elaz. New methods to color the vertices of a graph. Communications of the ACM, 22:251-256, Apr. 1979.

European Search Report for European Application No. EP 14 16 3924, dated Nov. 21, 2014.

* cited by examiner

RADIO RESOURCE CONTROL FOR DUAL-ACCESS-TECHNOLOGY CELLS

FIELD

The embodiments discussed herein are related to radio resource control.

BACKGROUND

Increasing popularity of smart phones and other mobile devices, together with increasing use of mobile internet applications have led to an exponential growth of data rate demands on cellular systems generally employing licensed radio spectrum ("licensed spectrum") resources. At the same time, limited spectrum resources are available to allow mobile network operators (MNOs) to meet current and future data rate demands.

The MNOs are further faced with the challenge of poor indoor coverage, particularly at an edge of a telecommunication system cell. Poor indoor coverage may be a significant challenge for MNOs, as most data traffic and voice calls originate from indoors.

To address the challenges of meeting ever-increasing data rate demands and poor indoor coverage, some proposed solutions include an increased reliance on femtocells. Generally, femtocells are small-range, low-power cells that may be deployed to enhance indoor coverage and offload some traffic from a macrocell. Offloading traffic to the femtocell may reduce congestion in the macrocell network and thus may help improve the experience for users connected to the telecommunication system via the macrocell. Like femtocells, other small cells such as picocells may also be used to reduce macrocell congestion and/or improve indoor coverage.

Concurrently, public IEEE 802.11 wireless hotspots have grown in number to provide internet access to customers over ever-increasing areas. Generally, IEEE 802.11 wireless hotspots provide wireless internet access via unlicensed radio spectrum ("unlicensed spectrum") resources.

Most modern user equipments (UE) are outfitted to communicate via both cellular technology and IEEE 802.11 technology. Furthermore, the 3rd Generation Partnership Project's (3GPP) standards provide an architecture that allows UE seamless interoperability over cellular systems and IEEE 802.11 wireless hotspots without user interaction.

The 3GPP has presented a few approaches to offload licensed spectrum traffic to an unlicensed spectrum in the Long Term Evolution (LTE) standards. A Local Internet Protocol (IP) Access (LIPA) approach allows a UE to access a local residential or corporate network through a 3GPP device—such as a femtocell—without employing the MNO's core network. A Selected IP Traffic Offload (SIPTO) approach allows UE traffic to flow from the 3GPP device directly to the internet via a local packet gateway (L-PGW), thus bypassing the MNO's core network. Both the LIPA and SIPTO approaches are transparent to UE and intend to avoid congestion in the MNO's core network. Furthermore, in the LIPA and SIPTO approaches, traffic at the UE occurs over the licensed spectrum via the UE's 3GPP radio. An IP Flow Mobility (IFOM) approach leverages the UE to determine whether to use a 3GPP device via the licensed spectrum, e.g. LTE, or an IEEE 802.11 access point (AP) via the unlicensed spectrum. Unlike the LIPA and SIPTO approaches, the IFOM is radio access network (RAN) transparent, and not UE transparent.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a base station includes a first interface, a second interface, a third interface, and an allocator. The first interface communicates with a plurality of terminals via a licensed radio spectrum. The second interface communicates with the plurality of terminals via an unlicensed radio spectrum. The third interface receives from a central controller a licensed radio spectrum assignment including a set of assigned physical resource blocks associated with the licensed radio spectrum. The allocator allocates unlicensed radio spectrum resources and the licensed spectrum physical resource blocks among the plurality of terminals.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Femtocells and other small cells may be used in a number of environments. It may be desirable to employ a high density of femtocells in environments that experience a high number of mobile devices and/or high requested data rates in a relatively small area, generally described herein as enterprise environments. Enterprise environments may include corporate premises, shopping complexes, stadiums, arenas, conference venues, dense residential regions, dense commercial regions, heavily trafficked urban regions, and the like.

When multiple femtocells or other small cells are deployed in a relatively small area, interference between neighboring femtocells may present a major challenge. Particular femtocells may accommodate both licensed radio spectrum ("licensed spectrum") and unlicensed radio spectrum ("unlicensed spectrum") traffic. Femtocells that may accommodate licensed spectrum and unlicensed spectrum traffic are generally described herein as dual-access-technology femtocells. Similarly, dual-access-technology cells may refer to any cell that may accommodate both licensed and unlicensed spectrum traffic.

Studies have been done on interference control between cells and on resource allocation between licensed and unlicensed spectrums. However, such studies have failed to consider dual-access-technology cells in enterprise environments. Some have considered cellular-spectrum-only femtocells in enterprise environments. Others have considered licensed and unlicensed spectrum management of a single dual-access-technology femtocell. These are generally not extendable to wide deployment of dual-access-technology cells, and are particularly not extendable to dual-access-technology femtocells or other small cells in enterprise environments.

Advantageously, embodiments described herein may allow dual-access-technology femtocells and other small cells to be successfully deployed in enterprise environments. Embodiments described herein may advantageously increase throughput and achieve fairness for most, if not all, network users. However, the techniques described herein may be expanded beyond dual-access-technology femtocells. Generally, the embodiments described herein may be employed in other settings where multiple types of radio spectrum resources are available and accessible by multiple devices.

Some embodiments as herein described may relate to a communication system based on the 3rd Generation Partnership Project's (3GPP) Long Term Evolution (LTE) radio access network. Descriptions involving LTE may also apply to 3GPP's Long Term Evolution Advanced (LTE-A) radio access network or Worldwide Interoperability for Microwave Access (WiMAX) radio access network. However, the embodiments described herein are not limited to the example communication systems described. Rather, the embodiments described herein may be applicable to other communication systems.

Embodiments of the present invention will be explained with reference to the accompanying drawings.

Figure 1:
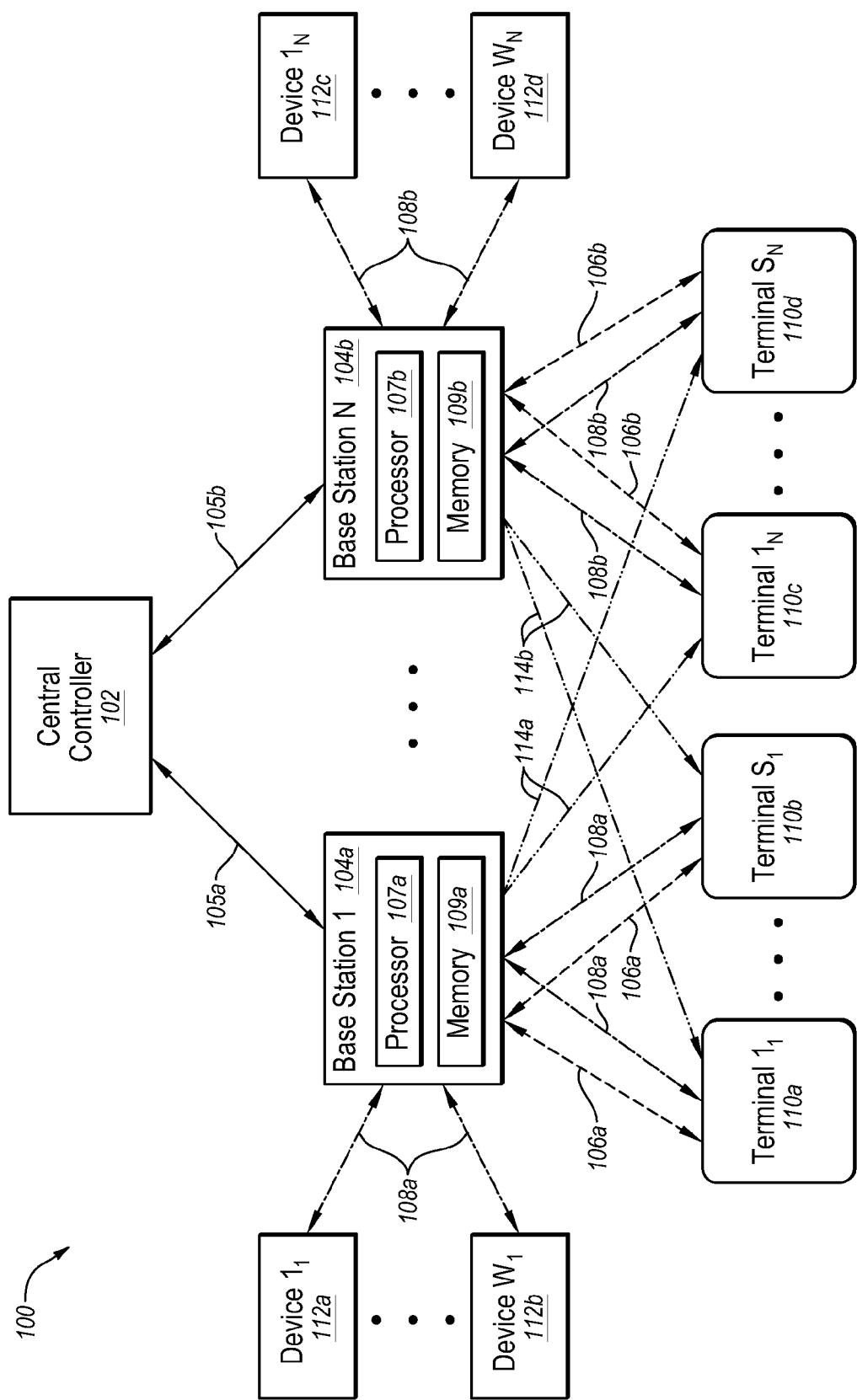
FIG. 1 is a diagrammatic view of an example network architecture of a telecommunication system.

FIG. 1 is a diagrammatic view of an example network architecture of a telecommunication system 100. In some embodiments, the network architecture may include the network architecture of an Evolved Universal Mobile Telecommunications System (E-UMTS). The E-UMTS may include an LTE radio access network or the like. The radio access network may include an E-UMTS Terrestrial Radio Access Network (eUTRAN). However, other types of network architecture may be used.

The telecommunication system 100 may include multiple base stations, designated generally as a first base station 104a up to an Nth base station 104b (collectively "base stations 104"). The base stations 104 may include base station equipment, including hardware and/or software for allowing radio communication with radio-communication-equipped nodes ("wireless nodes"). The base stations 104 may generally allow wireless nodes to wirelessly communicate with each other, and/or to wirelessly access a core network and/or an internet protocol (IP) network, or the like.

In some embodiments, the base stations 104 include multiple small cell base stations 104 deployed in an enterprise setting. For example, the base stations 104 may include multiple femtocells such as home eNodeBs (HeNBs) located in a close geographic region such as corporate premises, shopping complexes, stadiums, arenas, conference venues, dense residential regions, dense commercial regions, heavily trafficked urban regions, and the like.

In general, the base stations 104 may include hardware and software allowing radio communication over both a licensed spectrum and an unlicensed spectrum. The licensed spectrum may generally include portions of a radio spectrum licensed for transmission of cellular data. For example, the base stations 104 may be configured to transmit cellular data that complies with an LTE, such as 3GPP specification releases 8-12. The unlicensed spectrum may generally include portions of a radio spectrum set aside for license-free wireless communications. For example, the base stations 104 may be configured to communicate via an IEEE 802.11 interface or other wireless communication interface.

The base stations 104 may communicate with a central controller 102 via interfaces formed between the base stations 104 and the central controller 102. For example, Interface 105a may be formed between the first base station 104a and the central controller 102 and interface 105b may be formed between the N-th base station 104b and the central controller 102. Interface 105a and interface 105b (collectively "interfaces 105") may include wired connections, but in some instances interfaces 105 may alternately include wireless connections. As disclosed herein, the central controller 102 may assist in interference management between base stations 104 and/or in resource management in the licensed spectrum such that the base stations 104 may be deployed in an enterprise environment.

The base stations 104 may generally include processors 107a and 107b (collectively "processors 107") and memory 109a and 109b (collectively "memory 109"). Instructions may be stored on the memory 109. When the instructions are executed by the processors 107, the base stations 104 may perform operations related to and/or including the processes described herein.

The telecommunication system 100 may include multiple wireless nodes communicating with the base stations 104 over licensed and/or unlicensed spectrums. Wireless nodes that may communicate over both licensed and unlicensed spectrums are generally described herein as terminals. For example, terminals may include smartphones that allow LTE cellular communication, as well as IEEE 802.11 communication. Wireless nodes configured to communicate over only unlicensed spectrums are generally described herein as devices. For example, devices may include laptop computers that allow IEEE 802.11 communication, but are not equipped for cellular communication, or have temporarily disabled cellular communication.

As disclosed in FIG. 1, multiple terminals 110a, 110b, 110c, and 110d (collectively "terminals 110") may be associated with the base stations 104. For example, a first terminal 110a (designated as terminal $1_1$) through an $S_1$-th terminal 110b (designated as terminal $S_1$) may be associated with the first base station 104a.

The terminals 110 may form licensed spectrum interfaces 106a and 106b (collectively "licensed spectrum interfaces 106") with their associated base stations 104. Similarly, the terminals 110 may form unlicensed spectrum interfaces 108a and 108b (collectively "unlicensed spectrum interfaces 108") with their associated base stations 104. For example, the first terminal 110a through the $S_1$-th terminal 110b may form licensed spectrum interfaces 106a and unlicensed spectrum interfaces 108a with the first base station 104a. The terminals 110 may also experience interference 114a and 114b (collectively "interference 114") from unassociated base stations 104, generally in the licensed spectrum. The licensed spectrum interfaces 106 and the unlicensed spectrum interfaces 108 are generally wireless connections between the terminals 110 and the base stations 104 that allow data to be communicated between the terminals 110 and the base stations 104.

Multiple devices 112a, 112b, 112c, and 112d (collectively "devices 112") may be associated with the base stations 104. For example, a first device 112a (designated as device $1_1$) through a $W_1$-th device 112b (designated as device $W_1$) may be associated with the first base station 104a. The devices 112 may form unlicensed spectrum interfaces 108 with their associated base stations 104. For example, the first device 112a through the $W_1$-th device 112b may form unlicensed spectrum interfaces 108a with the first base station 104a.

The central controller 102, the terminals 110, and the devices 112 may include processors and memory (not shown), analogous to the processors 107 and memory 109 of the base stations 104.

Each of the terminals 110 may have a number of connections, generally with different minimum communication rate requirements. Each minimum communication rate requirement may be a function of the traffic type of each connection. For example, a terminal 110a may simultaneously have a conversational voice connection and a transmission control protocol (TCP) based connection. According to quality of service (QoS) requirements of each connection for each terminal 110, the base stations 104 may set a minimum rate requirement for each of the terminals 110. The minimum rate requirement for a particular terminal 110a, 110b, 110c, or 110d may be set to the sum of the minimum rate requirements for all connections of the particular terminal 110a, 110b, 110c, or 110d. The minimum rate requirements may generally be attained over the licensed and/or unlicensed spectrums.

Embodiments described herein may be employed to achieve the minimum rate requirements for all terminals 110 in a fair way. For example, an attempt may be made to maximize the minimum rate of the terminals 110 in the telecommunication system 100. However, different terminals 110 may have different minimum rate requirements. In some embodiments, a minimum proportional rate may be maximized, wherein the proportional rate of a particular terminal such as terminal 110a may be defined as a sum of the rates achieved by the terminal 110a over both the licensed and unlicensed spectrums for all the connections of the terminal 110a, divided by the sum of the minimum rate requested by the terminal 110a for all the connections of the terminal 110a. However, alternate objective functions may be defined depending on the preferences of MNOs. For example, an objective function may maximize the sum throughput of the entire telecommunication system 100. An example optimization formula is described below as Formula 1.

The formulas disclosed herein and the related discussions are generally described with reference to downlink communication. Uplink communication may be alternately or additionally considered in an analogous manner. Furthermore, for calculations related to LTE rate calculations, Shannon capacity may be used for simplifying the disclosure. However, other rate calculations may be conducted. For example, rate calculations may account for bandwidth efficiency due to different overheads such as cyclic-prefix and pilots. Furthermore, rate calculations may account for a signal to interference plus noise ratio (SINR) implementation efficiency due to receiver algorithms and supported modulation-coding schemes (MCS).

A number of the variables used in Formula 1 and/or other formulas disclosed herein are described below. Additional variables may be described in association with a particular formula and/or may be understood from the variable's context.

Variable N represents the number of base stations 104. Variable n represents the particular base stations 104; thus, n is generally a set of integers between 1 and N, inclusive.

$S_n$ represents the number of terminals 110 with both licensed spectrum interfaces 106 and unlicensed spectrum interfaces 108 connected to base station n. S represents the total number of terminals 110 in the network, i.e., the sum of $S_n$ for all N base stations 104. In Formula 1, i generally represents the particular terminals 110 of the entire telecommunication system 100; thus, for Formula 1, i is generally within a set of integers between 1 and S, inclusive. However, in all other formulas, i generally represents the particular terminals associated with a particular base station n; thus, for other formulas, i is generally within a set of integers between 1 and $S_n$, inclusive.

c represents a connection for a terminal. $C_i^{(n)}$ represents a set of connections c for terminal i associated with base station n.

$W_n$ represents the number of devices 112 with only an unlicensed spectrum interface 108 connected to base station n. W represents the total number of devices 112 in the network, i.e., the sum of $W_n$ for all N base stations 104. Device j generally represents the particular devices associated with a particular base station n; thus, j is generally within a set of integers between 1 and $W_n$, inclusive.

$P_{max}^{(n)}$ represents the maximum transmission power of base station n.

K represents a total number of physical resource blocks (PRBs) associated with the licensed spectrum. Physical resource block k generally represents a particular PRB; thus, k is generally within a set of integers between 1 and K, inclusive. However, in some instances, k may represent one or more subcarriers of the PRBs.

$P_{i,k}^{(n)}$ represents the transmission power from base station n to terminal i on PRB k.

$h_{i,k}^{(n)}$ represents channel gain from base station n to terminal i on PRB k.

$\sigma^2$ represents noise variance per PRB in the licensed spectrum.

B represents total system bandwidth.

$R_{AP}^{(n)}$ represents a maximum throughput that base station n may get in the downlink via the unlicensed spectrum. Each of the base stations 104 may generally calculate $R_{AP}^{(n)}$ given the total number of stations contending for resources on the unlicensed spectrum. In embodiments employing IEEE 802.11 as the unlicensed spectrum, IEEE 802.11 medium access control (MAC) performance may be heavily dependent on the number of stations contending for resources on the unlicensed spectrum. For example, stations contending for unlicensed spectrum resources at the first base station 104a may include the first base station 104a, the first device 112a through the W-th device 112b, and the first terminal 110a through the S-th terminal 110b, although some terminals may not contend for any unlicensed spectrum resources. Thus, if all terminals associated with base station n are transmitting to the base station n on the unlicensed spectrum, the total number of contending stations will equal $S_n+W_n+1$. In some embodiments, if a relatively large number of devices 112 connect to a base station 104a, the base station 104a may deactivate the unlicensed spectrum connectivity of some terminals 110 to reduce the contention for the unlicensed spectrum resources.

In some embodiments, it is assumed that each of the base stations 104 operate on different unlicensed spectrum channels, or at least that neighboring base stations use different unlicensed spectrum channels while the same unlicensed spectrum channel may be reused for a distant base station within the set of base stations 104, similar to the frequency reuse concept in mobile cellular communication. As a result, the contention on the unlicensed spectrum of a base station from devices or terminals connected to other base stations may be ignored. Such an assumption may be reasonable since a device or terminal usually tries to contend on the unlicensed spectrum channel with strongest received signal power, which is generally coming from the nearest base station.

However, this assumption, as well as other assumptions described herein, may be made to simplify the presentation of some embodiments, but do not limit the disclosure. For example, even when it is assumed that all devices and terminals may contend on any unlicensed spectrum of any of the base stations 104, or that all base stations 104 use the same unlicensed spectrum channel, the embodiments described herein may still be applicable.

$R_{w,j}^{(n)}$ represents a requested downlink data rate of a device j connected to base station n in the unlicensed spectrum.

$RU_{i,c}^{(n)}$ represents an estimated downlink data rate in the unlicensed spectrum assigned to the connection c of the terminal i associated with base station n.

$\bar{r}_{i,c}^{(n)}$ represents a minimum rate requirement for connection c for terminal i associated with base station n.

$w_{i,c}^{(n)}$ represents the number of PRBs assigned to the connection c of the terminal i associated with base station n.

$\Omega_n$ represents a set of terminals connected to base station n.
$\mathcal{M}_n$ represents a set of PRBs assigned to base station n.

FORMULA 1

$$\max_{\{\Omega_n, p_{i,k}^{(n)}, RU_{i,c}\}} \min_i \frac{1}{\sum_{c \in C_i} \bar{r}_{i,c}} \quad \text{1a}$$

$$\left( \sum_{k=1}^{K} \frac{B}{K} \log_2\left(1 + \frac{p_{i,k}^{(n)} h_{i,k}^{(n)}}{\sigma^2 + \sum_{m \neq n} p_{i,k}^{(m)} h_{i,k}^{(m)}}\right) + \sum_{c \in C_i} RU_{i,c} \right)$$

$$\text{subject to: } \sum_{k=1}^{K} \sum_{i \in \Omega_n} p_{i,k}^{(n)} \leq P_{max}^{(n)}, \forall n \quad \text{1b}$$

$$\sum_{i \in \Omega_n} \sum_{c \in C_i} RU_{i,c} \leq R_{AP}^{(n)} - \sum_{j=1}^{W_n} R_{w,j}^{(n)}, \forall n \quad \text{1c}$$

$$p_{i,k}^{(n)} \geq 0, \forall i, k, n \quad \text{1d}$$

$$RU_{i,c} \geq 0, \forall i, \forall c \in C_i \quad \text{1e}$$

$$\bigcup_{n=1}^{N} \Omega_n \subseteq \{1, 2, \ldots, S\} \quad \text{1f}$$

$$\Omega_n \cap \Omega_m = \emptyset, m \neq n \quad \text{1g}$$

In Formula 1, $p_{i,k}^{(n)}$ and $h_{i,k}^{(n)}$ respectively represent the allocated power and the channel gain from base station n to terminal i on PRB k, or in some instances, subcarrier k.

Subformulas 1b-1g represent various constraints of Formula 1. For example, subformula 1b represents the total transmission power constraint of each of the base stations 104.

Furthermore, subformula 1c ensures that the total unlicensed spectrum rate assigned to the terminals 110 associated with base station n is upper-bounded by the available unlicensed spectrum capacity. In order to avoid congestion on the unlicensed spectrum, it may be assumed that each base station n determines the unlicensed spectrum capacity desired to serve the $W_n$ devices 112 first and then provides downlink transmission in the unlicensed spectrum to all or some of the $S_n$ terminals 110 depending on the remaining unlicensed spectrum capacity. The optimization in the unlicensed spectrum is thus concerned with how each of the base stations 104 divides its rate among different terminals 110 in the downlink. The term $R_{AP}^{(n)} - \Sigma_{j=1}^{W_n} R_{w,j}^{(n)}$ represents the available unlicensed spectrum capacity. Available unlicensed spectrum capacity may be calculated using a number of existing theoretical formulas or practical methods, such as existing techniques for calculating available capacity in IEEE 802.11 networks.

Subformulas 1d and 1e ensure, respectively, non-negative transmission powers and non-negative unlicensed spectrum rates.

With reference to subformula 1f, if the telecommunication system 100 has enough capacity to serve all S terminals 110, then the union of $\Omega_n$ for all N base stations 104, may equal the set $\{1, 2, \ldots, S\}$. Otherwise, some terminals 110 will not be granted admission and, therefore, the union of the sets $\Omega_n$ will be a subset of $\{1, 2, \ldots, S\}$ as in subformula 1f.

Subformula 1g ensures that each of the terminals 110 is connected to only one of the base stations 104, i.e., subformula 1g acts to ensure that the sets $\Omega_n$ are disjoint.

The optimization variables in Formula 1 represent the optimal terminal and base station association through finding the set $\Omega_n$, the optimal power allocation for each terminal i in base station n and for each PRB k, i.e., $p_{i,k}^{(n)}$, and the optimal unlicensed spectrum rate distribution to different terminals 110, i.e., $RU_{i,c}$. Finding the optimal values for these variables may indicate an optimal network-wide maximum minimum rate fairness.

However, Formula 1 is a non-convex mixed-integer programming problem, in part due to the binary association variables associated with $\Omega_n$. Moreover, to find the solution at a central controller 102 generally requires the central controller 102 to know the channel gains of the terminals 110 on all PRBs. As a result, solving Formula 1 may be very hard and computationally impractical in many instances.

In some embodiments, a sub-optimal hierarchical approach may be employed to fairly distribute licensed and unlicensed spectrum resources. The tasks associated with the sub-optimal hierarchical approach may be divided between the base stations 104 and the central controller 102.

In some embodiments, each base station 104 may estimate a number of requested resources in the licensed spectrum based on the number of associated terminals 110, the rate requirements of the terminals 110, the channel conditions of the telecommunication system 100, and/or the rate the terminals 110 may potentially attain via the unlicensed spectrum. Each base station 104 may provide information about the requested resources to the central controller 102. Alternately or additionally, the central controller 102 may estimate the requested resources in the licensed spectrum for each of the base stations 104.

The central controller 102 may implement interference management via graph coloring methods or the like. The central controller 102 may also implement licensed spectrum resource allocation between the base stations 104 based on the requested resources associated with each base station.

The base stations 104 may fine-tune the licensed spectrum resource allocation, power allocation, and unlicensed spectrum resource allocation among the terminals 110 and devices 112. Advantageously, embodiments disclosed herein may satisfy data rate requirements and quality of service (QoS) requirements of the terminals 110 and/or devices 112. Furthermore, embodiments may achieve fairness between the terminals 110 and/or devices 112.

In some embodiments, it is assumed that each terminal 110 is associated with the base station 104 with the largest average received signal power at the particular terminal 110. Consequently, each terminal 110 may be assumed to be associated with the base station 104 with the largest observed signal to noise ratio (SNR) at the particular terminal 110. With such an assumption, the optimization problem outlined in Formula 1 may be easier to solve, as the binary association values $\Omega_n$ will generally be known. Similarly, in some embodiments, it is assumed that each device 112 is associated with the base station 104 with the largest average received signal power at the particular device 112 in the unlicensed spectrum. Consequently, each device 112 is assumed to be associated with the base station 104 with the largest observed SNR at the particular device 112 in the unlicensed spectrum.

Figure 2:
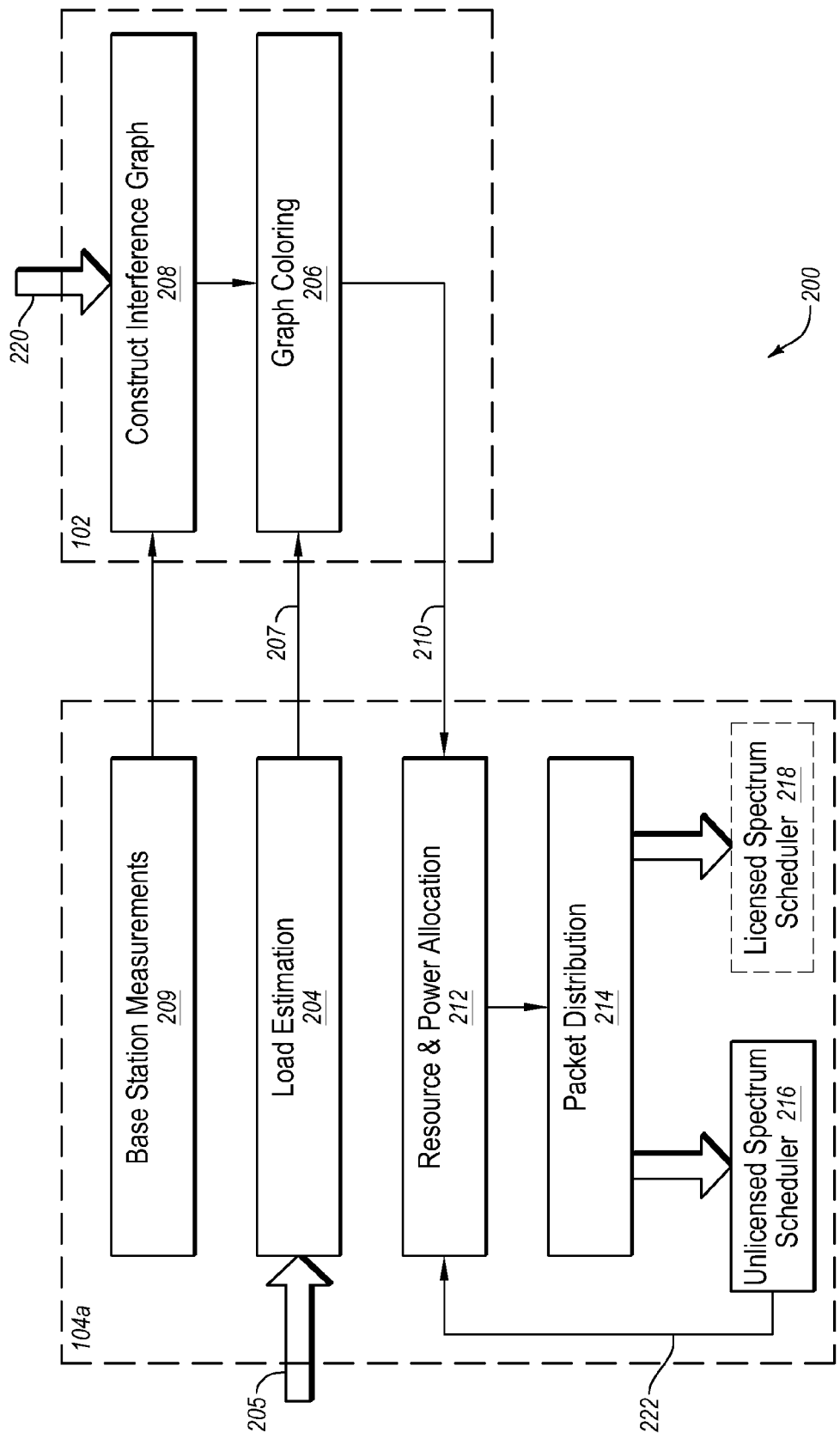
FIG. 2 is a diagrammatic view of a telecommunication system including a central controller and a base station.

FIG. 2 is a diagrammatic view of a telecommunication system 200 including the central controller 102 and the base station 104a. Although the base station 104a is described, the description of the base station 104a may generally apply to any individual base station of the base stations 104 of FIG. 1. Thus, reference may be made to the base stations 104 although only the base station 104a is shown in FIG. 2.

The telecommunication system 200 may perform a number of functions described herein. In some embodiments, for example, the telecommunication system 200 may construct an interference graph 208, perform load estimation 204, perform graph coloring 206, perform resource and power allocation 212, perform packet distribution 214, perform unlicensed spectrum scheduling 216, and may optionally perform licensed spectrum scheduling 218.

The central controller 102 may construct an interference graph 208 based on base station measurements 209 received from the base station 104a and/or based on terminal reports 220. Optionally, terminals generally corresponding to the terminals 110 of FIG. 1 may provide the terminal reports 220 to the central controller 102. The terminal reports 220 may include Received Signal Strength Indicator (RSSI) of neighboring base stations obtained during handover processes.

In some embodiments, base station measurements 209 may be determined at least in part by the base station 104a when the base station 104a is powered on. The base station 104a may listen to neighboring base stations' control channels and reference signal transmissions. From the information collected, the base station 104a may determine the cell identification of neighboring base stations 104 as well as determine the path loss from each of the neighboring base stations 104.

The central controller 102 may construct an interference graph 208 of vertices representing base stations 104 and directed edges representing interference and/or jamming conditions between base stations 104. In some embodiments, interference and/or jamming conditions are declared when the difference between channel gains experienced by a terminal from an associated base station and an interfering base station exceed a pre-determined threshold. As a result, weak interference signals may be neglected. Advantageously, by neglecting weak interference signals the complexity of the interference graph may be reduced and the graph coloring process described herein may be simplified. Alternately, all possible interference conditions may be considered for a directed edge between any two base stations.

In some embodiments, an interference graph and graph coloring 206 may be achieved in a manner similar to that described in Sadr, S.; Adve, R., "Hierarchical resource allocation in femtocell networks using graph algorithms," 2012 *IEEE International Conference on Communications (ICC)*, pp. 4416-4420, June 2012. Alternately, graph coloring 206 may be performed via a modified iterative greedy method as disclosed herein.

In addition to constructing an interference graph 208, the telecommunication system 200 may perform load estimation 204, which may be used in graph coloring 206. In some embodiments, the base stations 104 may perform the load estimation 204. Alternately, the load estimation 204 for one or more of the base stations 104 may be performed by the central controller 102.

In performing the load estimation, the base station 104a may set a minimum rate requirement for the terminals 110 associated with the base station 104a. The minimum rate requirement may generally be attained via the licensed and/or unlicensed spectrums based on the traffic type and the capacity of the licensed and/or unlicensed spectrums.

In performing the load estimation 204, the base station 104a may attempt to estimate the resources, i.e., PRBs, each terminal requires in the licensed spectrum to achieve each terminal's minimum rate requirement. The load estimation 204 may be based, for example, on the number of terminals associated with the base station 104a, as well as the terminals' rate requirements 205, channel conditions, and an expected rate in the unlicensed spectrum.

In some embodiments, the base station 104a may attempt to determine the minimum number of PRBs that satisfy the requirements of the associated terminals, which may help minimize interference generated at neighboring base stations. For example, load estimation 104 may be determined using Formula 2 disclosed and discussed below.

FORMULA 2

$$\min_{\{w_{i,c}^{(n)}, P_i^{(n)}, RU_{i,c}^{(n)}\}} \sum_{i \in \Omega_n} \sum_{c \in C_i^{(n)}} w_{i,c}^{(n)} \qquad \text{2a}$$

$$\text{subject to: } w_{i,c}^{(n)} \frac{B}{K} \log_2\left(1 + \frac{P_i^{(n)} H_i^{(n)}}{w_{i,c}^{(n)} \sigma^2}\right) + RU_{i,c}^{(n)} \geq \beta \bar{r}_{i,c}^{(n)}, \qquad \text{2b}$$

$$\forall\, i \in \Omega_n, \forall\, c \in C_i^{(n)}$$

$$\sum_{i=1}^{S_n} \sum_{c \in C_i^{(n)}} RU_{i,c}^{(n)} \leq R_{AP}^{(n)} - \sum_{j=1}^{W_n} R_{w,j}^{(n)} \qquad \text{2c}$$

$$\sum_{i \in \Omega_n} P_i^{(n)} \leq P_{max}^{(n)} \qquad \text{2d}$$

$$\sum_{i \in \Omega_n} \sum_{c \in C_i^{(n)}} w_{i,c}^{(n)} \leq K \qquad \text{2e}$$

$$P_i^{(n)} \geq 0, \forall\, i \in \Omega_n \qquad \text{2f}$$

$$w_{i,c}^{(n)} \geq 0, \forall\, i \in \Omega_n, \forall\, c \in C_i^{(n)} \qquad \text{2g}$$

$$0 \leq RU_{i,c}^{(n)} \leq RU_{i,c,max}^{(n)}, \forall\, i \in \Omega_n, \forall\, c \in C_i^{(n)} \qquad \text{2h}$$

Formula 2 may minimize the total requested load, i.e., the number of PRBs, per base station n over optimization control variables $w_{i,c}^{(n)}$, $P_i^{(n)}$, and $RU_{i,c}^{(n)}$. Variable $w_{i,c}^{(n)}$ represents the number of PRBs assigned to terminal i connected to base station n for connection c. Variable $P_i^{(n)}$ represents the average allocated power for the PRBs assigned to terminal i connected to base station n. Variable $RU_{i,c}^{(n)}$ represents the unlicensed spectrum rate assigned to terminal i connected to base station n for connection c.

Formula 2 is a convex optimization problem in the optimization variables $w_{i,c}^{(n)}$, $P_i^{(n)}$, and $RU_{i,c}^{(n)}$. Solving Formula 2 may thus be more manageable than the network-wide optimization problem defined in Formula 1.

In Formula 2 and the formulas that follow, the subscript i is the index of the terminal within the set of terminals connected to a particular base station n, i.e., $\Omega_n$. For example, for base station n, i is generally within a set of integers between 1 and $S_n$, inclusive.

Subformula 2b represents the minimum rate requirement constraints for associated terminals, i.e., terminals in the set $\Omega_n$. The term $$w_{i,c}^{(n)} \frac{B}{K} \log_2\left(1 + \frac{P_i^{(n)} H_i^{(n)}}{w_{i,c}^{(n)} \sigma^2}\right)$$

represents the licensed spectrum rate for terminal i connected to base station n for connection c, whereas variable $RU_{i,c}^{(n)}$ represents the rate on the unlicensed spectrum for terminal i connected to base station n for connection c.

Parameter β represents a feasibility parameter and may be initially set to 1 such that the achieved rate over both the licensed and unlicensed spectrums for each connection c for each terminal i may be greater than or equal to the corresponding minimum rate requirement, represented by variable $\bar{r}_{i,c}^{(n)}$. However, system capacity may be insufficient to achieve such minimum rate requirements, particularly when some connections or terminals have high requested rates or when the number of terminals 110 or devices 112 is very large. As a result, Formula 2 may have no feasible solution, in part because to satisfy the rate requirements of all connections for all associated terminals, base station n will need more PRBs than are available for the particular system bandwidth. Put another way, Formula 2 may have no feasible solution when subformula 2b and subformula 2e are not simultaneously satisfiable.

Therefore, the requested rates for the terminals associated with base station n may be lowered such that the base station n is able to feasibly solve Formula 2. For example, the value of β may be suitably reduced.

In some embodiments, a suitable reduced value of β may be identified via a bisection approach. For example, if Formula 2 is infeasible when β=1, the feasibility of Formula 2 may be rechecked with β=0.5. If the problem is still infeasible, the value of β is decreased to 0.25 and the feasibility is rechecked, however, if β=0.5 results in a feasible solution, then β=0.75 is evaluated. The bisection approach may be continued until a maximum number of bisection steps or until a maximum value of β equal to or less than 1 is found.

Other approaches for decreasing the value of β to promote a feasible solution for Formula 2 may be employed. In some embodiments, a separate parameter $\beta_c$ may be defined for each connection c depending on the QoS requirement or a QoS Class Indicator (QCI) level. The $\beta_c$ parameters for connections with low-priority QCI may be decreased first. As a result, the requested rate of each connection may be adjusted separately with the trade-off of increased computational complexity.

Subformula 2b assumes each base station n is aware of the average channel power of each associated terminal, i.e., variable $H_i^{(n)}$. Furthermore, subformula 2b assumes uniform power allocation to all the PRBs assigned to the same terminal. Because average channel power values are used, the estimated load, i.e., term $\Sigma_{c \in C_i^{(n)}} w_{i,c}^{(n)}$, may represent a coarse estimate of the requested terminal load. The coarse estimate of the total load per base station n may be suitable for the purpose of graph coloring 206 at the central controller 102. In some embodiments, after graph coloring the base stations may consider channel variations in the resource and power allocation step 212, as described herein.

Subformula 2c ensures the sum of the unlicensed spectrum rates assigned to the terminals of base station n is upper-bounded by the available unlicensed spectrum capacity at base station n. Subformula 2d constrains the maximum transmission power for base station n. Subformula 2e ensures that the sum of requested PRBs per base station does not exceed the total number of PRBs in the system. Subformulas 2f and 2g act to ensure, respectively, non-negative allocated power and non-negative estimated loads.

Subformula 2h bounds the unlicensed rate for connection c for terminal i connected to base station n with a lower bound equal to 0 and an upper bound equal to $RU_{i,c,max}^{(n)}$. The upper bound may guarantee that the distribution of rates for each connection c for each terminal i connected to base station n is based in part on the traffic type of the connection c.

In embodiments employing LTE for licensed spectrum communication and IEEE 802.11 for unlicensed spectrum communication, IEEE 802.11 based communications are generally not desirable for Guaranteed Bit Rate (GBR) or delay-sensitive traffic types. In some embodiments, distribution of rates over LTE or IEEE 802.11 is performed based on the QCI, which is defined for various connection types by 3GPP. The value of QCI is generally known at the base stations for each terminal's connection type. Based on the value of QCI for each connection c of a terminal i, the base station n may set an upper bound for the unlicensed spectrum rate.

Table 1, shown below, includes example QCIs for various example connection types.

TABLE 1

| QCI | Resource Type | Priority | Packet Delay Budget (ms) | Packet Error Loss Rate | Example Services |
| --- | --- | --- | --- | --- | --- |
| 1 | GBR | 2 | 100 | $10^{-2}$ | Conversational Voice |
| 2 | GBR | 4 | 150 | $10^{-3}$ | Conversational Voice (live streaming) |
| 3 | GBR | 3 | 50 | $10^{-3}$ | Real Time Gaming |
| 4 | GBR | 5 | 300 | $10^{-6}$ | Non-Conversational Video (buffered streaming) |
| 5 | Non-GBR | 1 | 100 | $10^{-6}$ | IMS Signalling |
| 6 | Non-GBR | 6 | 300 | $10^{-6}$ | Video (buffered streaming), TCP-based (e.g., www, e-mail, chat, ftp, etc.) |
| 7 | Non-GBR | 7 | 100 | $10^{-3}$ | Voice, Video (Live Streaming), Interactive Gaming |
| 8 | Non-GBR | 8 | 300 | $10^{-6}$ | Video (buffered streaming), TCP-based (e.g., www, e-mail, chat, ftp, etc.) |
| 9 | Non-GBR | 9 | 300 | $10^{-6}$ | Video (buffered streaming), TCP-based (e.g., www, e-mail, chat, ftp, etc.) |

In some embodiments, the unlicensed spectrum upper bound variable, i.e., $RU_{i,c,max}^{(n)}$, of subformula 2h may be set equal to $\mu_{QCI}\bar{r}_{i,c}^{(n)}$, where the value of $\mu_{QCI}$ depends on the QCI value such that $0 \leq \mu_{QCI} \leq 1$. The value of $\mu_{QCI}$ may be based on the QCI value such that traffic may relatively favor the licensed spectrum or the unlicensed spectrum. For example, for a connection with a QCI level of 1, the value of $\mu_{QCI}$ may be set to 0 to ensure the connection gets no IEEE 802.11 rate, i.e., the connection's rate requirement is to be fulfilled completely using LTE resources. Conversely, for a non-GBR connection with low priority, such as a connection with a QCI of 9, the base station may set $\alpha_{QCI}$ to 1 to allow the entire requested rate of the connection to be obtained over IEEE 802.11. For other types of connections, the base station may set $\mu_{QCI}$ to a value between 0 and 1 according to the priorities, characteristics and/or QCI of the connection.

The base station 104a outputs 207 the requested load from load estimation 204 to the central controller 102 for use in graph coloring 206. Alternately, the load estimation 204 may be performed directly by the central controller 102. The output 207 of the load estimation 204 may be a number, i.e., $\mathcal{M}_n$, representing a sum of requested PRBs for base station 104a. In some embodiments, a ceiling or rounding operator may be applied to $\mathcal{M}_n$ such that an integer number of PRBs are requested. For example, $\mathcal{M}_n$ may be generally defined as $$M_n = \left\lceil \sum_{i \in \Omega_n} \sum_{c \in C_i^{(n)}} w_{i,c}^{(n)} \right\rceil.$$

In some embodiments, Formula 2 may be simplified to reduce its complexity. One simplification may include assuming uniform power assignments for all terminals and depending on the resource and power allocation 212 to assign power to the terminals. The simplified formula is disclosed as Formula 3.

FORMULA 3

$$\min_{\{w_{i,c}^{(n)}, RU_{i,c}^{(n)}\}} \sum_{i \in \Omega_n} \sum_{c \in C_i^{(n)}} w_{i,c}^{(n)} \quad \text{3a}$$

$$\text{subject to: } w_{i,c}^{(n)} \frac{B}{K} \log_2\left(1 + \frac{P_{max}^{(n)} H_i^{(n)}}{K\sigma^2}\right) + RU_{i,c}^{(n)} \geq \beta \bar{r}_{i,c}^{(n)}, \quad \text{3b}$$
$$\forall i \in \Omega_n, \forall c \in C_i^{(n)}$$

$$\sum_{i=1}^{S_n} \sum_{c \in C_i^{(n)}} RU_{i,c}^{(n)} \leq R_{AP}^{(n)} - \sum_{j=1}^{W_n} R_{w,j}^{(n)} \quad \text{3c}$$

$$\sum_{i \in \Omega_n} \sum_{c \in C_i^{(n)}} w_{i,c}^{(n)} \leq K \quad \text{3d}$$

$$w_{i,c}^{(n)} \geq 0, \forall i \in \Omega_n, \forall c \in C_i^{(n)} \quad \text{3e}$$

$$0 \leq RU_{i,c}^{(n)} \leq RU_{i,c,max}^{(n)}, \forall i \in \Omega_n, \forall c \in C_i^{(n)} \quad \text{3f}$$

Formula 3 is a linear programming problem in the variables $w_{i,c}^{(n)}$ and $RU_{i,c}^{(n)}$. As a result, Formula 3 may be efficiently solved using methods such as interior point methods or a simplex method.

Alternately or additionally, Formula 2 may be simplified via a heuristic approach which decouples the estimation of the unlicensed spectrum rates, i.e., $RU_{i,c}^{(n)}$, from the licensed spectrum rates, i.e., $w_{i,c}^{(n)}$.

Figure 3:
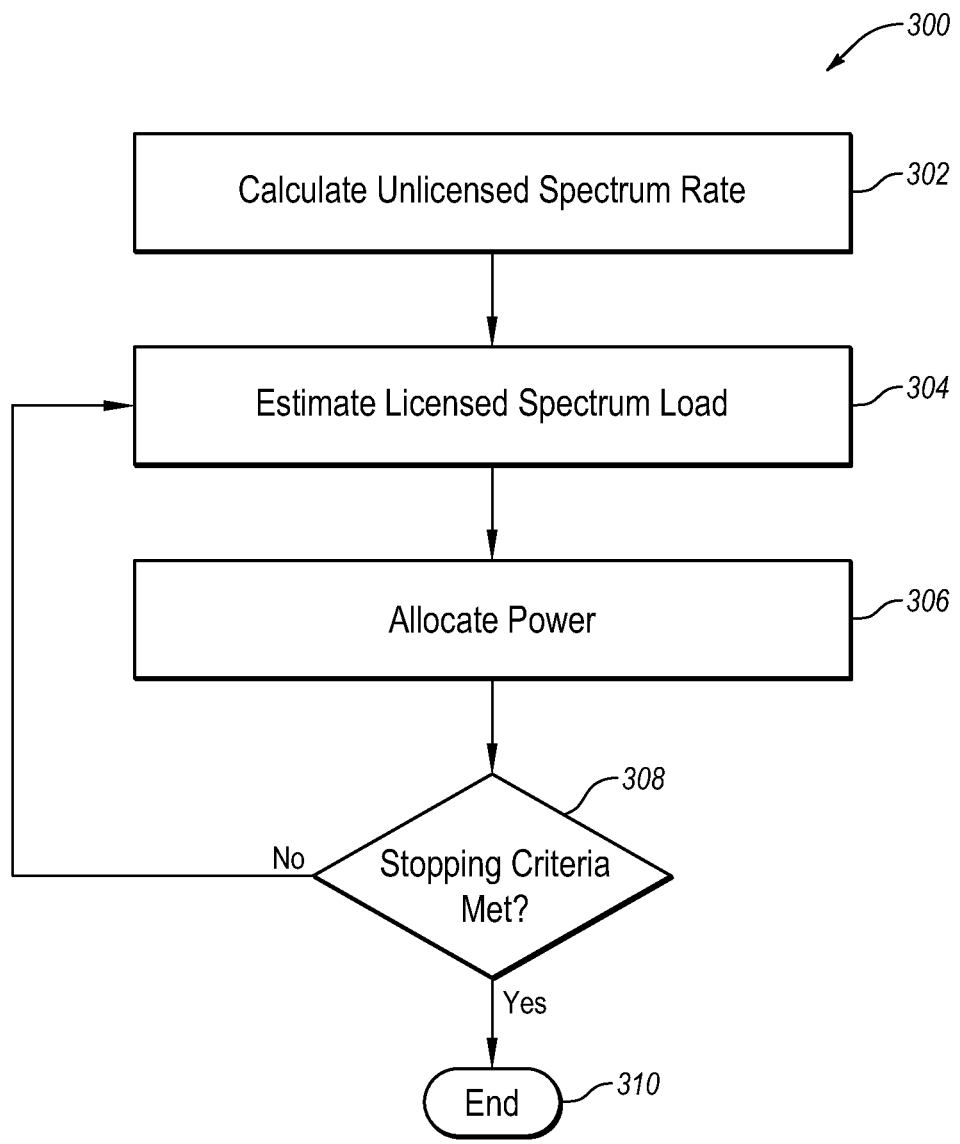
FIG. 3 is a flowchart of an example load estimation method.

FIG. 3 is a flowchart of an example load estimation method 300. The method 300 may begin with calculating the unlicensed spectrum rate at block 302. The unlicensed spectrum rate may be represented by the variable $RU_{i,c}^{(n)'}$, which may be defined as in Formula 4.

$$RU_{i,c}^{(n)'} = \qquad \text{FORMULA 4}$$

$$\begin{cases} \min\left\{ \dfrac{\bar{r}_{i,c}^{(n)}}{\sum_{l \in \Omega_n'} \sum_{s \in C_l^{(n)}} \bar{r}_{l,s}^{(n)}} \left( R_{AP}^{(n)} - \sum_{j=1}^{W_n} R_{w,j}^{(n)} \right), \bar{r}_{i,c}^{(n)} \right\}, & \text{if } PQ_{i,c}^{(n)} \geq PQ_{th} \\ 0, & \text{otherwise} \end{cases}$$

Variable $PQ_{i,c}^{(n)}$ of Formula 4 represents a priority of a certain QCI for connection c of terminal i connected to base station n. Variable $PQ_{th}$ represents a threshold that may be adjusted based on the unlicensed spectrum congestion experienced by the telecommunication system 200. For example, when the telecommunication system 200 is experiencing relatively low traffic on the unlicensed spectrum, $PQ_{th}$ may be lowered to encourage more communication over the unlicensed spectrum. Conversely, when the unlicensed spectrum becomes relatively congested, $PQ_{th}$ may be raised to urge high-priority traffic to the licensed spectrum. When $PQ_{i,c}^{(n)}$ is less than $PQ_{th}$, communication may be restricted to the licensed spectrum. However, when $PQ_{i,c}^{(n)}$ is greater than, or equal to $PQ_{th}$, communication may occur over the licensed and unlicensed spectrum to achieve the minimum rate requirement for the corresponding connection and terminal.

The set $\Omega'_n$ represents a set of terminals associated with base station n with QCI values greater than or equal to $PQ_{th}$. The available unlicensed spectrum capacity, i.e., $R_{AP}^{(n)} - \sum_{j=1}^{W_n} R_{w,j}^{(n)}$, may be distributed among terminals proportional to the terminals' requested rates, i.e., $\bar{r}_{i,c}^{(n)}$.

The minimization operator may encourage fairness between terminals by avoiding assigning any of the terminals a rate higher than the terminals' requested rate. However, in some instances, the unlicensed spectrum may still have excess capacity after the requested rates of the terminals in $\Omega'_n$ have been satisfied. The excess capacity may be determined and distributed to the terminals. Thus, the excess capacity may be distributed to the terminals such that the terminals may be assigned a rate in excess of the terminals' requested rate. In some embodiments, the excess unlicensed spectrum capacity, i.e., $R_{excess}$ may be determined as disclosed in Formula 5.

$$R_{excess} = R_{AP}^{(n)} - \sum_{j=1}^{W_n} R_{w,j}^{(n)} - \sum_{i=1}^{S_n} RU_{i,c}^{(n)'} \qquad \text{FORMULA 5}$$

Furthermore, the terminals' unlicensed spectrum rate, i.e., $RU_{i,c}^{(n)*}$, may be adjusted to include the excess capacity as disclosed in Formula 6.

$$RU_{i,c}^{(n)*} = RU_{i,c}^{(n)'} + \dfrac{\bar{r}_{i,c}^{(n)}}{\sum_{l \in \Omega_n'} \sum_{s \in C_l^{(n)}} \bar{r}_{l,s}^{(n)}} R_{excess} \qquad \text{FORMULA 6}$$

The method 300 continues at block 304, where the licensed spectrum load is estimated. At block 306, the licensed spectrum power is allocated. In some embodiments, the load estimation 304 and power allocation 306 may be performed as an iterative method, as indicated in block 308. In some embodiments, the iterative method including blocks 304-308 may be based on the conventional concept of water-filling and may be performed as disclosed in Formulas 7, 8, and 9.

$$w_{i,c}^{(n)}(t+1) = \frac{\bar{r}_{i,c}^{(n)} - RU_{i,c}^{(n)*}}{\frac{B}{K}\log_2(1 + P_i^{(n)}(t+1)\alpha_i^{(n)})}, \quad \text{FORMULA 7}$$

$$w_{i,c}^{(n)}(0) = \frac{K}{\sum_{i\in\Omega_n''} |C_i^{(n)}|}$$

$$\lambda_i^{(n)}(t+1) = \frac{\sum_{i\in\Omega_n''}\sum_{c\in C_i^{(n)}} w_{i,c}^{(n)}(t+1)}{P_{max}^{(n)} + \sum_{i\in\Omega_n''}\frac{\sum_{c\in C_i^{(n)}} w_{i,c}^{(n)}(t+1)}{\alpha_i^{(n)}}} \quad \text{FORMULA 8}$$

$$P_i^{(n)}(t+1) = \left(\frac{1}{\lambda_i^{(n)}(t)} - \frac{1}{\alpha_i^{(n)}}\right)^+ \quad \text{FORMULA 9}$$

Variable t in Formulas 7, 8, and 9 represents an iteration index. Set $\Omega_n''$ represents the set of terminals with minimum rate requirements that have not yet been fully satisfied in the unlicensed spectrum.

Parameter $\lambda_i^{(n)}$ represents an intermediate parameter for water filling. Variable $\alpha_i^{(n)}$ is defined as $$\frac{H_i^{(n)}}{\sigma^2}$$

and represents the average SNR of the $i^{th}$ terminal connected to base station n.

Formulas 7-9 are performed iteratively until stopping criteria are met ("Yes" at block 308 of FIG. 3). In some embodiments, the stopping criteria may be met when a maximum number of iterations is reached, or when $w_{i,c}^{(n)}(t)$ or $P_i^{(n)}(t)$ reach a steady state value.

With reference again to FIG. 2, the central controller 102 may perform interference management and licensed spectrum resource assignment for the base stations 104. In some embodiments, the interference management and licensed spectrum resource assignment may be performed via graph coloring 206. The graph coloring 206 may be based on the interference graph constructed at block 208, as well as the output 207 of the load estimation 204 performed by each of the base stations 104 or at the central controller 102. Based on the graph coloring, the central controller 102 may assign 210 licensed spectrum resources, i.e., a set of PRBs, to each of the base stations 104.

Optimal graph coloring is a non-deterministic polynomial-time hard ("NP-hard") problem conventionally solved using heuristics. In some embodiments, an iterative greedy algorithm as disclosed herein may be used. The iterative greedy algorithm may allow frequency reuse between base stations 104 where significant interference is not expected. As a result, the system capacity may be increased. To perform the iterative greedy algorithm, a conventional interference graph formula may be modified into a weighted interference graph where the weight of each directed edge, i.e. $\rho_{nm}$, is given by Formula 10.

$$\rho_{nm} = \frac{P_{max}^{(n)}}{M_n} G_{nm} \quad \text{FORMULA 10}$$

Variable $G_{nm}$ of Formula 10 represents an average path loss between base station n and base station m, which may be defined as an average path loss between base station n and the terminals associated with base station m. Alternately, $G_{nm}$ may be defined as the path loss between base station n and a fictitious terminal located at base station m.

The value $$\frac{P_{max}^{(n)}}{M_n}$$

represents the average power per PRB for base station n.

Introducing weighting to the interference graph may promote the graph coloring scheme to be adaptive to the base stations' demands in terms of requested load. For example, if the total requested load of all base stations 104 is less than or equal to the total number of available PRBs and/or channels in the system, i.e., if $\Sigma_{n=1}^{N} M_n \leq K$, then orthogonal frequency allocation may be provided by the graph coloring algorithm without mutual interference between base stations 104. However, if the base stations 104 request more PRBs than are available in the telecommunication system 200, the graph coloring algorithm disclosed herein may reuse frequencies of PRBs, i.e., colors, in a way that minimizes the interference seen by each of the base stations 104, rather than assigning each of the base stations 104 fewer PRBs than requested.

Figure 4:
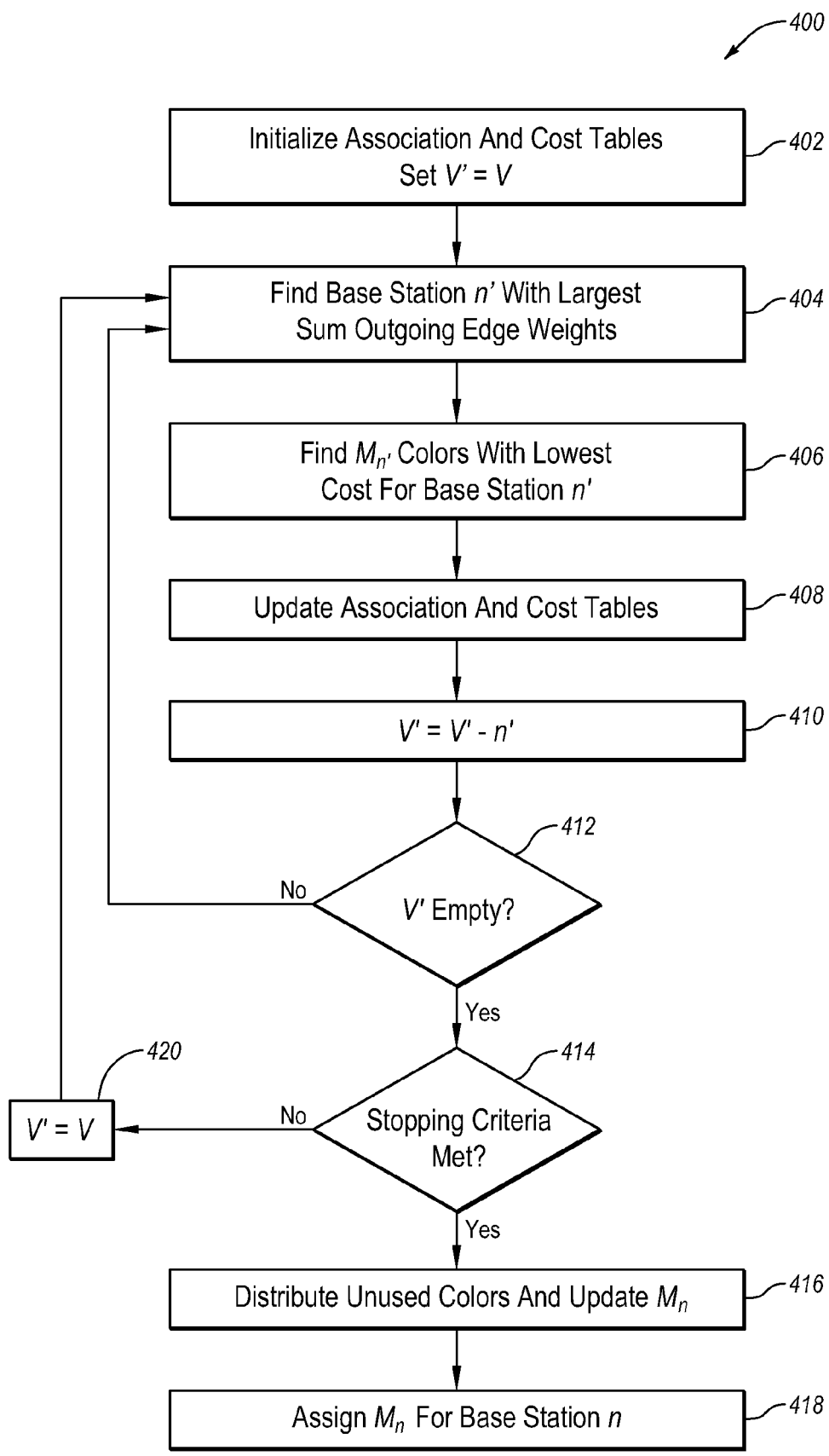
FIG. 4 is a flowchart of an example graph coloring method.

FIG. 4 is a flowchart of an example graph coloring method 400. The graph coloring method 400 may employ frequency reuse. The method 400 may begin at block 402, where an association table and a cost table may be initialized by setting all entries in the association and cost tables to 0. Furthermore, set V', which represents the set of uncolored vertices in the constructed interference graph, is defined to be equal to V, which represents the set of all vertices in the constructed interference graph. As disclosed with reference to block 208 of FIG. 2, each vertex of the constructed interference graph may represent one of the base stations 104.

The association table may be an N×J table with binary entries $a_{nj}$. N may be the total number of base stations 104 and J may be the total number of colors. The parameter J may be set equal to K, i.e., one color may be denoted per each available PRB. Alternately, the parameter J may be set equal to K/v, i.e., one color may be denoted per v PRBs. A value of v greater than 1 may decrease the complexity of the graph coloring, but at the expense of creating a coarser and less flexible channel assignment. An entry $a_{nj}$ in the association table may be set to 1 if base station n is assigned color j. Otherwise, the entry $a_{nj}$ may be set to 0.

The cost table may be an N×J table with real-valued entries $c_{nj}$ representing the cost of using color j for base station n. The cost may be defined as the sum of the interference powers from all other base stations 104 assigned the color j. An entry $c_{nj}$ may be defined as disclosed in Formula 11.

$$c_{nj} = \sum_{\substack{m=1 \\ m\neq n}}^{N} a_{mj} \frac{P_{max}^{(m)}}{M_m} G_{mn} \quad \text{FORMULA 11}$$

The method 400 may continue at block 404, where a base station n' causing the largest sum interference may be found. In some embodiments, this may include choosing the base station n' with the largest sum of outgoing edge weights as disclosed in Formula 12.

$$n' = \underset{n \in V}{\operatorname{argmax}} \sum_{\substack{m=1 \\ m \neq n}}^{N} \rho_{nm} = \underset{n \in V}{\operatorname{argmax}} \frac{P_{max}^{(n)}}{M_n} \sum_{\substack{m=1 \\ m \neq n}}^{N} G_{nm} \qquad \text{FORMULA 12}$$

Choosing the base station causing the largest sum interference may be advantageous, as the chosen base station n' may be considered to be the most troublesome of the base stations 104. In some embodiments, if more than one base station n' has the same largest sum of outgoing edge weights, the base station n' with the largest $\mathcal{M}_n$ may be chosen.

The method 400 may continue at block 406, where $\mathcal{M}_{n'}$ colors with the lowest cost may be selected for the base station n' chosen in block 404. The colors may be determined as disclosed in Formula 13.

$$c_{n',j} = \sum_{\substack{m=1 \\ m \neq n}}^{N} a_{mj} \frac{P_{max}^{(m)}}{M_m} G_{mn'} \qquad \text{FORMULA 13}$$

In some embodiments, if more than $\mathcal{M}_{n'}$ colors result in the same minimal cost, the colors that are most frequently used are chosen. The colors that are most frequently used may be identified from the association table. Selecting the colors that are most frequently used may provide less interference for subsequent base stations in the coloring process, as colors that are less frequently used generally have a higher probability of having a lower cost to the subsequent base stations.

The method 400 may continue at block 408, where the allocation table and cost table are updated. The allocation table and the cost table are generally updated to reflect the colors, i.e., PRBs, allocated to the base station n' in block 406. In block 410, the set of uncolored vertices, V', is updated by removing the vertex associated with the base station n' from the set.

In block 412, the set of uncolored vertices, V', is checked to determine whether the set is empty. If V' is empty, i.e., if all of the vertices are colored, the method 400 continues to block 414. However, if V' is not empty, i.e., if one or more vertices have not been colored yet, the method 400 returns to block 404, where a new base station n' is chosen and subsequently colored in block 406.

At block 414, it may be determined whether stopping criteria have been met. If the stopping criteria are met, the method 400 may continue to block 416. If the stopping criteria are not met, the method 400 may continue to block 420, where the set of uncolored vertices, V', may be again defined as the set of all vertices V, and blocks 404-414 of the method 400 may be repeated. The iterative approach to the graph coloring introduced by blocks 414 and 420 may enhance the graph coloring method 400. In some embodiments, because the method 400 performs coloring of vertices in a sequential manner, the effect of a colored base station is not taken into consideration in the cost of previously colored base stations, which may be mitigated by coloring base stations in a descending order of the amount of interference they cause in block 404. This sequential behavior is enhanced by the iterative approach by repeating blocks 404-414. Stopping criteria may include a maximum number of iterations, a steady state value for a reuse metric, or the like. The reuse metric may be defined as a total amount of mutual interference power caused by the base stations.

When the stopping criteria have been met in block 414, the method 400 may continue to block 416. At block 416, any unused colors, i.e., unassigned PRBs, may be distributed to the base stations. In some embodiments, the unassigned PRBs may be distributed to each base station in an amount proportional to the sum of the requested rates of an individual base station's associated terminals over the requested rate of all base stations' associated terminals. In some embodiments, the association table may then be updated to include the PRBs distributed at block 416.

The method 400 may conclude at block 418 by assigning each base station the final set of PRBs, i.e., $\mathcal{M}_n$, according to the association table. In some embodiments, each base station may also be provided with a set of interfering base stations on each PRB k and the average interference power from every interfering base station in the set of interfering base stations.

Referring again to FIG. 2, the base station 104a may receive 210 a set of assigned PRBs as a result of method 400.

The base station 104a may then perform resource and power allocation 212 for each terminal (not shown) assigned to the base station 104a. The resource and power allocation 212 may include fine-tuning the resource allocation to each terminal and performing power allocation on a per-PRB basis for resources in the licensed spectrum. The resource and power allocation 212 may further include unlicensed spectrum resource allocation for the associated terminals. Resource allocation in both the licensed and unlicensed spectrums may be done jointly to satisfy the terminals' data rate requirements and to achieve fairness between the terminals.

The central controller 102 may generally perform coarse-resolution resource allocation through graph coloring 206, generally on a longer timescale than the base stations 104. The resource allocation may be based on long-term interference management statistics provided by the base station measurements 209 and/or terminal reports 220. The set of PRBs assigned 210 to each base station 104 may be assigned to achieve a trade-off between interference control between the base stations 104 and spectrum reuse to enhance the total system throughput.

In comparison, the base station 104a may perform fine-resolution resource allocation to the terminals 110 on both the licensed and unlicensed spectrums via the resource and power allocation 212, generally on a shorter timescale than the central controller 102. For example, in embodiments employing LTE-A, resource reallocation may be allowed every Transmission Time Interval (TTI), generally equal to 1 millisecond (ms). In some embodiments, the central controller 102 may perform graph coloring 206 and resource allocation on a timescale of hundreds of TTIs, whereas the base station 104a may perform resource allocation 212 every TTI or every few TTIs.

In some embodiments, to ensure fairness among terminals, the base station 104a performs licensed spectrum allocation, per-PRB power allocation, and unlicensed spectrum allocation at block 212 according to a max-min fairness criteria described in Formula 14.

FORMULA 14

$$\max_{\{p_{i,k}^{(n)}, s_{i,k}^{(n)}, RU_{ic}\}} \min_{i} \frac{1}{\sum_{c \in C_i^{(n)}} \bar{r}_{i,c}^{(n)}} \qquad 14a$$

$$\left( \frac{B}{K} \sum_{k \in M_n} s_{i,k}^{(n)} \log_2\left(1 + \frac{p_{i,k}^{(n)} h_{i,k}^{(n)}}{s_{i,k}^{(n)}\left(\sigma^2 + \sum_{j \in I_k} P_k^{(jn)}\right)}\right) + \sum_{c \in C_i^{(n)}} RU_{i,c}^{(n)} \right)$$

-continued $$\text{subject to: } \sum_{k \in \mathcal{M}_n} \sum_{i \in \Omega_n} p_{i,k}^{(n)} \le P_{max}^{(n)} \quad \text{14b}$$

$$\sum_{i=1}^{S_n} \sum_{c \in C_i^{(n)}} RU_{i,c}^{(n)} \le R_{AP}^{(n)} - \sum_{j=1}^{W_n} R_{w,j}^{(n)} \quad \text{14c}$$

$$\sum_{i \in \Omega_n} s_{i,k}^{(n)} = 1, \forall k \in \mathcal{M}_n \quad \text{14d}$$

$$s_{i,k}^{(n)} \ge 0, p_{i,k}^{(n)} \ge 0, \forall i \in \Omega_n, \forall k \in \mathcal{M}_n \quad \text{14e}$$

$$0 \le RU_{i,c}^{(n)} \le RU_{i,c,max}^{(n)}, \forall i \in \Omega_n, \forall c \in C_i^{(n)} \quad \text{14f}$$

Formula 14 may generally maximize the worst ratio of achieved rate to requested rate for all terminals associated with base station n. As seen in subformula 14a, the achieved rate may be obtained over the licensed spectrum, the unlicensed spectrum, or both. The requested rate for a particular terminal may be defined as the sum of the requested rates for all of the connections of the particular terminal.

In Formula 14, set $I_k$ represents a set of interfering base stations on each PRB k. Variable $P_k^{(jn)}$ represents the average interference power from every interfering base station j in the set $I_k$ to base station n on PRB k. Variable $s_{i,k}^{(n)}$ represents the time-sharing coefficient of PRB k for terminal i in base station n. In some embodiments, base station n may allocate a fraction of PRBs to the terminals. For example, one or more terminals may be allocated a PRB k for a fraction of time.

Subformula 14b ensures the sum of the per-PRB power over all PRBs in set $\mathcal{M}_n$ and over all terminals associated with base station n is limited to the base station n's maximum transmission power.

Subformula 14c ensures the sum of the unlicensed spectrum rates assigned to the terminals of base station n is upper-bounded by the available unlicensed spectrum capacity at base station n.

Subformula 14d ensures that the sum of all time shares of a PRB k is equal to 1.

Subformulas 14e and 14f define the ranges of $s_{i,k}^{(n)}$, $p_{i,k}^{(n)}$, and $RU_{i,c}^{(n)}$. In some embodiments, the distribution of the licensed spectrum resources, i.e., $s_{i,k}^{(n)}$, for each terminal i among the connections c requested by the terminal may be accomplished in a fine-resolution scheduling step in an optional licensed spectrum scheduler 218 of the base station 104a. The distribution of the licensed spectrum resources may depend on the requested rate of each connection, i.e., $\bar{r}_{i,c}^{(n)}$, as well as the assigned unlicensed spectrum rate for each connection, i.e., $RU_{i,c}^{(n)}$, as calculated by Formula 14.

Advantageously, Formula 14 is a convex optimization problem that may be solved efficiently and in an easy manner. However, in some embodiments, Formula 14 may be simplified. For example, $$\frac{p_{i,k}^{(n)}}{s_{i,k}^{(n)}}$$

may be approximated as $$\frac{P_i^{(n)}}{\sum_{c \in C_i^{(n)}} w_{i,c}^{(n)}},$$

where $P_i^{(n)}$ and $\Sigma_{c \in C_i^{(n)}} w_{i,c}^{(n)}$ are obtained at the load estimation 204.

Alternately or additionally, Formula 14 may be simplified by decoupling the resource allocation over the licensed and unlicensed spectrums, similar to the decoupling simplification described with reference to Formula 2. Decoupling the resource allocation over the licensed and unlicensed spectrums may lead to a simplified problem as disclosed in Formula 15. Advantageously, Formula 15 is a linear programming problem that may be computationally easier to solve than Formula 14.

FORMULA 15

$$\max_{s_{i,k}^{(n)}} \min_i \frac{1}{\sum_{c \in C_i^{(n)}} \bar{r}_{i,c}^{(n)}} \quad \text{15a}$$

$$\left( \frac{B}{K} \sum_{k \in \mathcal{M}_n} s_{i,k}^{(n)} \log_2 \left( 1 + \frac{P_i^{(n)} h_{i,k}^{(n)}}{\sum_{c \in C_i^{(n)}} w_{i,c}^{(n)} \left( \sigma^2 + \sum_{j \in I_k} P_k^{(jn)} \right)} \right) + \sum_{c \in C_i^{(n)}} RU_{i,c}^{(n)*} \right)$$

$$\text{subject to: } \sum_{i \in \Omega_n} s_{i,k}^{(n)} = 1, \forall k \in \mathcal{M}_n \quad \text{15b}$$

$$s_{i,k}^{(n)} \ge 0, \forall i \in \Omega_n, \forall k \in \mathcal{M}_n \quad \text{15c}$$

Formula 14 and Formula 15 may employ the average interference information sent from the central controller 102 to the base stations 104. Advantageously, the average interference information may result in an achieved rate from the respective optimization problem that is relatively close to the actual achieved rate. However, in some embodiments, the average interference information may not be sent by the central controller 102 to the base stations 104 such that the communication overheads between the central controller 102 and the base stations 104 are reduced.

In some embodiments, the SNR—as opposed to the SINR—may be considered. When the SNR is considered, the central controller 102 may send only the set of allocated PRBs to the base stations 104, reducing the communication overheads between the central controller 102 and the base stations 104. However, performance may be degraded, particularly where the average requested rate of all terminals is relatively high and the interference is large enough that it may be detrimental to ignore.

In embodiments where the interference is ignored, the optimization problem may be formulated as in Formula 14, but with the interference term, i.e., $\Sigma_{j \in I_k} P_k^{(jn)}$, omitted. The resulting formula may be further simplified in a manner similar to Formula 15, as disclosed in Formula 16. Advantageously, Formula 16 is a linear programming problem that may be computationally easier to solve than Formula 14.

FORMULA 16

$$\max_{s_{i,k}^{(n)}} \min_i \frac{1}{\sum_{c \in C_i^{(n)}} r_{i,c}^{(n)}} \quad (12a)$$

$$\left( \frac{B}{K} \sum_{k \in \mathcal{M}_n} s_{i,k}^{(n)} \log_2 \left( 1 + \frac{p_{i,k}^{(n)} h_{i,k}^{(n)}}{\sum_{c \in C_i^{(n)}} w_{i,c}^{(n)} \sigma^2} \right) + \sum_{c \in C_i^{(n)}} RU_{i,c}^{(n)} \right)$$

$$\text{subject to:} \sum_{i \in \Omega_n} s_{i,k}^{(n)} = 1, \forall k \in \mathcal{M}_n \quad (12b)$$

$$s_{i,k}^{(n)} \geq 0, \forall i \in \Omega_n, \forall k \in \mathcal{M}_n \quad (12c)$$

Upon determining the resource and power distribution in block 212, the base station 104a may perform packet distribution 214. The optimization variables $w_{i,c}^{(n)}$ and $RU_{i,c}^{(n)}$ provided for each connection c and terminal i from the resource and power distribution 212 are generally sent to the packet distribution 214. The packet distribution 214 may accordingly divide the downlink packets to the terminals over the licensed and unlicensed spectrums.

Given the number of PRBs assigned to each terminal and the duration of the resource allocation, denoted by $T_d$, the packet distribution 214 may calculate the number of bits to send over the licensed spectrum in the duration $T_d$. Furthermore, the packet distribution 214 may use the unlicensed spectrum downlink rate to the terminals, i.e., $RU_{i,c}^{(n)}$, to calculate the number of bits to send over the unlicensed spectrum in the duration $T_d$.

Given the number of bits to send over the licensed and unlicensed spectrums, a simple packet scheduling technique may be applied to divide packets between the licensed and unlicensed spectrums. For example, the packet distribution 214 may include a pair of virtual buckets for each terminal. The buckets may generally correspond to buckets used in conventional token bucket data rate monitoring techniques. One bucket may be associated with the licensed spectrum and the other bucket may be associated with the unlicensed spectrum. Upon receiving a downlink packet for terminal i, the packet distribution 214 may assign the packet to the licensed and/or unlicensed spectrums proportionally based on the ratio of the licensed spectrum rate, the unlicensed spectrum rate, and the accumulated number of bits transmitted over the spectrums as tracked by the buckets. In some embodiments, the buckets may reset at the beginning of the duration $T_d$. For example, the buckets may reset such that the buckets are empty at the beginning of the duration $T_d$.

An unlicensed spectrum scheduler 216 may receive packets from the packet distribution 214, as well as packets to devices (not shown) generally corresponding to the devices 112 as described with reference to FIG. 1. The unlicensed spectrum scheduler 216 may multiplex the packets for contention on the unlicensed spectrum. The unlicensed spectrum scheduler 216 may provide information 222 about the unlicensed spectrum to the resource and power allocation 212. For example, if the unlicensed spectrum scheduler experiences a large busy period, the provided information 222 may cause the resource and power allocation 212 to decrease the unlicensed spectrum traffic via one or more formulas described herein or by some other method.

An optional licensed spectrum scheduler 218 may manage additional scheduling requirements. For example, in embodiments employing LTE, the licensed spectrum scheduler 218 may accommodate hybrid automatic repeat request (HARQ) error correction scheduling. In other embodiments, the licensed spectrum scheduling 218 may accommodate other error checking and/or scheduling features.

The licensed spectrum scheduler 218 may receive packets from the packet distribution 214 and may apply conventional licensed spectrum scheduling mechanisms. For example, the licensed spectrum scheduler 218 may schedule downlink packets according to scheduling mechanisms that take into account the varying nature of the channel, uplink CQI reports of terminals, and/or acknowledgement (ACK) or negative acknowledgement (NAK) feedback from the terminals.

The licensed spectrum scheduler 218 may run more frequently than the resource and power allocation 212 to promote a better scheduling resolution more adaptive to channel conditions.

Figure 5:
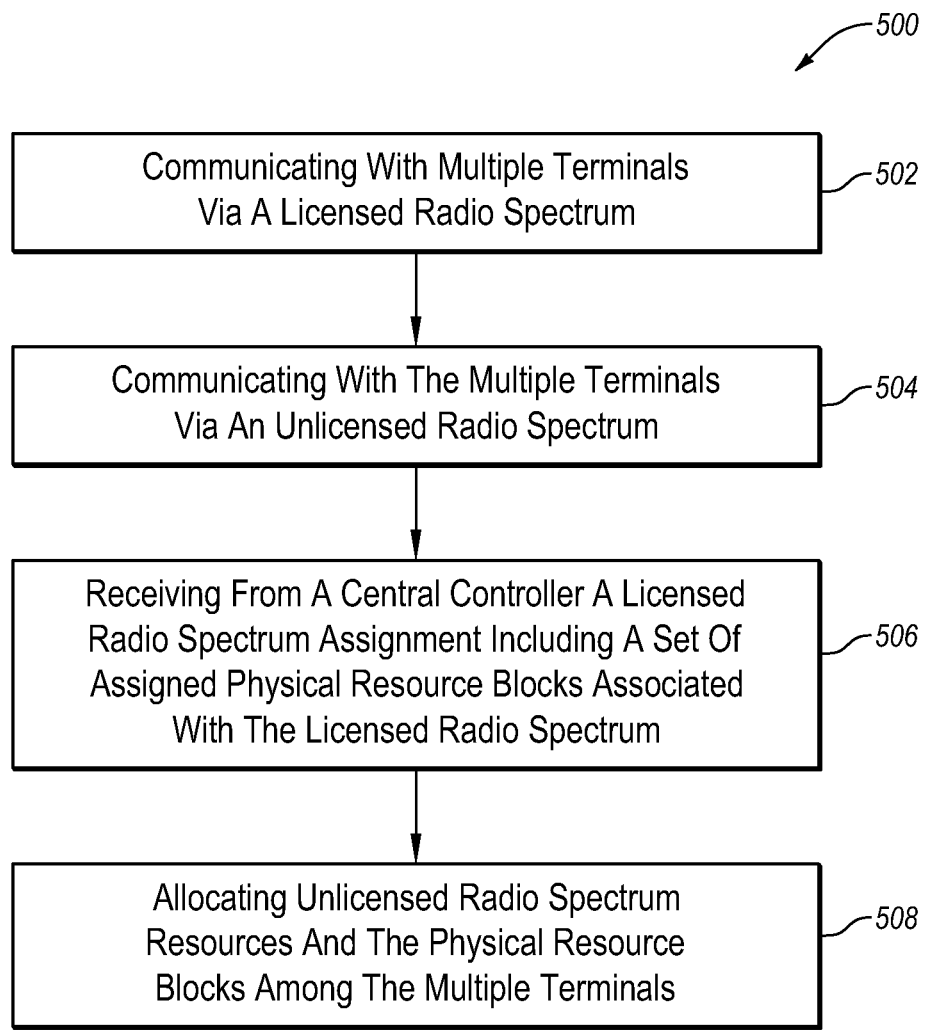
FIG. 5 is a flowchart of an example method of controlling radio resources.

FIG. 5 is a flowchart of an example method 500 of controlling radio resources. The method 500 may be performed, in some embodiments, by a base station, such as the base stations 104 of FIG. 1. The method may begin at block 502 by communicating with multiple terminals via a licensed radio spectrum. The terminals may generally correspond to the terminals 110 described with reference to FIG. 1. The licensed radio spectrum may generally correspond to the licensed spectrum described with reference to FIG. 1. Communication with the multiple terminals via the licensed radio spectrum may include uplink and/or downlink communication.

The method 500 may continue at block 504 and may include communicating with the multiple terminals via an unlicensed radio spectrum. The unlicensed radio spectrum may generally correspond to the unlicensed spectrum described with reference to FIG. 1. Communication with the multiple terminals via the unlicensed radio spectrum may include uplink and/or downlink communication.

The method 500 may continue at block 506 and may include receiving from a central controller a licensed radio spectrum assignment including a set of assigned physical resource blocks associated with the licensed radio spectrum. The central controller may generally correspond to the central controller 102 described with reference to FIGS. 1 and 2. The assigned physical resource blocks may generally correspond to the assigned set of PRBs, i.e. $\mathcal{M}_n$, as described with reference to FIG. 2.

The method 500 may continue at block 508 and may include allocating unlicensed radio spectrum resources and the licensed spectrum physical resource blocks among the multiple terminals. Allocating unlicensed radio spectrum resources and the licensed spectrum physical resource blocks among the multiple terminals may generally correspond to the resource and power allocation 212 as described with reference to FIG. 2.

In some embodiments, the method 500 may further include estimating radio resources desired by the multiple terminals for both the licensed radio spectrum and the unlicensed radio spectrum. Estimating radio resources desired by the multiple terminals for both the licensed radio spectrum and the unlicensed radio spectrum may generally correspond to the load estimation 204 as described with reference to FIG. 2. In some embodiments, the radio resources desired by the multiple terminals for both the licensed radio spectrum and the unlicensed radio spectrum may be estimated at least in part by decoupling an estimation of unlicensed radio spectrum rates from licensed radio spectrum rates. In some embodiments, the radio resources desired by the multiple terminals for both the licensed radio spectrum and the unlicensed radio spectrum are estimated at least in part by determining a minimum number of physical resource blocks that satisfy rate requirements of the plurality of terminals.

Furthermore, the method 500 may also include transmitting to the central controller the estimated radio resources desired by the multiple terminals for the licensed radio spectrum. Transmitting to the central controller the estimated radio resources desired by the multiple terminals for the licensed radio spectrum may generally correspond to outputting the load estimation 207 to the central controller 102 as described with reference to FIG. 2.

In some embodiments, the method 500 may further include distributing packets to be communicated to a terminal of the multiple terminals between the licensed radio spectrum and the unlicensed radio spectrum. Distributing the packets may generally correspond to the packet distribution 214 as described with reference to FIG. 2. In some embodiments, the packets to be communicated via the unlicensed radio spectrum are distributed to an unlicensed spectrum scheduler and the packets to be communicated via the licensed radio spectrum are distributed to a licensed spectrum scheduler. The unlicensed spectrum scheduler and the licensed spectrum scheduler may generally, respectively correspond to the unlicensed spectrum scheduler 216 and the licensed spectrum scheduler 218 described with reference to FIG. 2.

The embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While some of the system and methods described herein are described as being implemented in software, implementations in hardware or a combination of software and hardware are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A base station comprising:
a first interface configured to communicate with a plurality of terminals via a licensed radio spectrum;
a second interface configured to communicate with the plurality of terminals via an unlicensed radio spectrum;
an estimator configured to estimate radio resources desired by the plurality of terminals for both the licensed radio spectrum and the unlicensed radio spectrum;
a third interface configured to:
transmit to a central controller the estimated radio resources desired by the plurality of terminals for the licensed radio spectrum, and
receive from the central controller a licensed radio spectrum assignment including a set of assigned physical resource blocks associated with the licensed radio spectrum; and
an allocator configured to allocate unlicensed radio spectrum resources and the physical resource blocks among the plurality of terminals.

2. The base station of claim 1, wherein the estimator is configured to estimate the radio resources desired by the plurality of terminals for both the licensed radio spectrum and the unlicensed radio spectrum at least in part by decoupling an estimation of unlicensed radio spectrum rates from licensed radio spectrum rates.

3. The base station of claim 1, wherein the estimator is configured to estimate the radio resources desired by the plurality of terminals for both the licensed radio spectrum and the unlicensed radio spectrum at least in part by determining a minimum number of physical resource blocks that satisfy rate requirements of the plurality of terminals.

4. The base station of claim 1, wherein the allocator is configured to allocate the unlicensed radio spectrum resources and the physical resource blocks at least in part by maximizing a worst ratio of an achieved rate to a requested rate for all terminals of the plurality of terminals.

5. The base station of claim 4, wherein the allocator is further configured to allocate the unlicensed radio spectrum resources and the physical resource blocks with Quality of Service (QoS) guarantees based on a traffic type for each connection for all terminals.

6. The base station of claim 1, further comprising a distributor configured to distribute packets to be communicated to a terminal of the plurality of terminals, the distributor further configured to distribute the packets between the licensed radio spectrum and the unlicensed radio spectrum, wherein the packets to be communicated via the unlicensed radio spectrum are distributed to an unlicensed spectrum scheduler and packets to be communicated via the licensed radio spectrum are distributed to a licensed spectrum scheduler.

7. A non-transitory computer-readable medium having computer instructions stored thereon that are executable by a processing device to perform operations for controlling radio resources in a telecommunication system, the operations comprising:

communicating with a plurality of terminals via a licensed radio spectrum;

communicating with the plurality of terminals via an unlicensed radio spectrum;

receiving from a central controller a licensed radio spectrum assignment including a set of assigned physical resource blocks associated with the licensed radio spectrum; and allocating unlicensed radio spectrum resources and the physical resource blocks among the plurality of terminals, wherein the unlicensed radio spectrum resources and the physical resource blocks are allocated at least in part by maximizing a worst ratio of an achieved rate to a requested rate for all terminals of the plurality of terminals.

8. The non-transitory computer-readable medium of claim 7, wherein the operations further comprise:

estimating radio resources desired by the plurality of terminals for both the licensed radio spectrum and the unlicensed radio spectrum; and transmitting to the central controller the estimated radio resources desired by the plurality of terminals for the licensed radio spectrum.

9. The non-transitory computer-readable medium of claim 8, wherein the radio resources desired by the plurality of terminals for both the licensed radio spectrum and the unlicensed radio spectrum are estimated at least in part by decoupling an estimation of unlicensed radio spectrum rates from licensed radio spectrum rates.

10. The non-transitory computer-readable medium of claim 8, wherein the radio resources desired by the plurality of terminals for both the licensed radio spectrum and the unlicensed radio spectrum are estimated at least in part by determining a minimum number of physical resource blocks that satisfy rate requirements of the plurality of terminals.

11. The non-transitory computer-readable medium of claim 7, wherein the unlicensed radio spectrum resources and the physical resource blocks are allocated with Quality of Service (QoS) guarantees based on a traffic type for each connection for all terminals.

12. The non-transitory computer-readable medium of claim 7, wherein the operations further comprise distributing packets to be communicated to a terminal of the plurality of terminals between the licensed radio spectrum and the unlicensed radio spectrum, and wherein the packets to be communicated via the unlicensed radio spectrum are distributed to an unlicensed spectrum scheduler and the packets to be communicated via the licensed radio spectrum are distributed to a licensed spectrum scheduler.

13. A method of controlling radio resources, the method comprising:

communicating with a plurality of terminals via a licensed radio spectrum;

communicating with the plurality of terminals via an unlicensed radio spectrum;

estimating radio resources desired by the plurality of terminals for both the licensed radio spectrum and the unlicensed radio spectrum;

transmitting to a central controller the estimated radio resources desired by the plurality of terminals for the licensed radio spectrum;

receiving from the central controller a licensed radio spectrum assignment including a set of assigned physical resource blocks associated with the licensed radio spectrum; and allocating unlicensed radio spectrum resources and the physical resource blocks among the plurality of terminals.

14. The method of claim 13, wherein the radio resources desired by the plurality of terminals for both the licensed radio spectrum and the unlicensed radio spectrum are estimated at least in part by decoupling an estimation of unlicensed radio spectrum rates from licensed radio spectrum rates.

15. The method of claim 13, wherein the radio resources desired by the plurality of terminals for both the licensed radio spectrum and the unlicensed radio spectrum are estimated at least in part by determining a minimum number of physical resource blocks that satisfy rate requirements of the plurality of terminals.

16. The method of claim 13, wherein the unlicensed radio spectrum resources and the physical resource blocks are allocated at least in part by maximizing a worst ratio of an achieved rate to a requested rate for all terminals of the plurality of terminals, and wherein the unlicensed radio spectrum resources and the physical resource blocks are allocated with Quality of Service (QoS) guarantees based on a traffic type for each connection for all terminals.

17. The method of claim 13, further comprising distributing packets to be communicated to a terminal of the plurality of terminals between the licensed radio spectrum and the unlicensed radio spectrum, wherein the packets to be communicated via the unlicensed radio spectrum are distributed to an unlicensed spectrum scheduler and the packets to be communicated via the licensed radio spectrum are distributed to a licensed spectrum scheduler.

18. A base station comprising:

a first interface configured to communicate with a plurality of terminals via a licensed radio spectrum;

a second interface configured to communicate with the plurality of terminals via an unlicensed radio spectrum;

a third interface configured to receive from a central controller a licensed radio spectrum assignment including a set of assigned physical resource blocks associated with the licensed radio spectrum; and an allocator configured to allocate unlicensed radio spectrum resources and the physical resource blocks among the plurality of terminals at least in part by maximizing a worst ratio of an achieved rate to a requested rate for all terminals of the plurality of terminals.

19. The base station of claim 18, wherein the allocator is further configured to allocate the unlicensed radio spectrum resources and the physical resource blocks with Quality of Service (QoS) guarantees based on a traffic type for each connection for all terminals.

20. The base station of claim 18, further comprising a distributor configured to distribute packets to be communicated to a terminal of the plurality of terminals, the distributor further configured to distribute the packets between the licensed radio spectrum and the unlicensed radio spectrum, wherein the packets to be communicated via the unlicensed radio spectrum are distributed to an unlicensed spectrum scheduler and packets to be communicated via the licensed radio spectrum are distributed to a licensed spectrum scheduler.

21. The base station of claim 18, further comprising an estimator configured to estimate radio resources desired by the plurality of terminals for both the licensed radio spectrum and the unlicensed radio spectrum at least in part by decoupling an estimation of unlicensed radio spectrum rates from licensed radio spectrum rates,
    wherein the third interface is further configured to transmit to the central controller the estimated radio resources desired by the plurality of terminals for the licensed radio spectrum.

22. The base station of claim 18, further comprising an estimator configured to estimate radio resources desired by the plurality of terminals for both the licensed radio spectrum and the unlicensed radio spectrum at least in part by determining a minimum number of physical resource blocks that satisfy rate requirements of the plurality of terminals,
    wherein the third interface is further configured to transmit to the central controller the estimated radio resources desired by the plurality of terminals for the licensed radio spectrum.

\* \* \* \* \*